(12) United States Patent
Westrich

(10) Patent No.: US 11,029,041 B2
(45) Date of Patent: Jun. 8, 2021

(54) ON-DEMAND HOT WATER REPURPOSING SYSTEM AND METHOD

(71) Applicant: Harold Westrich, Ottumwa, IA (US)

(72) Inventor: Harold Westrich, Ottumwa, IA (US)

( * ) Notice: Subject to any disclaimer, the term of this patent is extended or adjusted under 35 U.S.C. 154(b) by 289 days.

(21) Appl. No.: 15/891,850

(22) Filed: Feb. 8, 2018

(65) Prior Publication Data

US 2018/0224133 A1 Aug. 9, 2018

Related U.S. Application Data

(60) Provisional application No. 62/456,421, filed on Feb. 8, 2017.

(51) Int. Cl.
| | | |
|---|---|---|
| *F24D 19/10* | (2006.01) | |
| *E03B 1/04* | (2006.01) | |
| *E03B 7/04* | (2006.01) | |
| *F16K 31/00* | (2006.01) | |
| *G05D 23/19* | (2006.01) | |
| *G05D 23/275* | (2006.01) | |
| *G05D 23/08* | (2006.01) | |
| *F24D 17/00* | (2006.01) | |

(52) U.S. Cl.
CPC ............ *F24D 19/103* (2013.01); *E03B 1/048* (2013.01); *E03B 7/045* (2013.01); *F16K 31/002* (2013.01); *G05D 23/192* (2013.01); *G05D 23/27543* (2013.01); *F24D 17/0078* (2013.01); *G05D 23/08* (2013.01)

(58) Field of Classification Search
CPC ............ F24D 17/0078; F24D 19/1021; F24D 19/1024; F24D 19/103; G05D 23/08; G05D 23/192; G05D 23/1333; G05D 23/2541; G05D 23/2754; G05D 23/27543; F16K 31/002; E03B 1/048; E03B 7/045
See application file for complete search history.

(56) References Cited

U.S. PATENT DOCUMENTS

| | | | |
|---|---|---|---|
| 3,885,584 A | 5/1975 | Hock | |
| 5,584,432 A * | 12/1996 | Lockhart | ................ E03C 1/041 236/101 R |
| 7,726,332 B2 | 6/2010 | Fiske | |
| 7,779,857 B2 | 8/2010 | Acker | |
| 8,272,395 B2 | 9/2012 | Lo | |
| 2002/0062867 A1 | 5/2002 | Kempf et al. | |

(Continued)

FOREIGN PATENT DOCUMENTS

GB 2172413 A * 9/1986 ............... E03C 1/05

*Primary Examiner* — Marc E Norman

(57) ABSTRACT

A system and method of minimizing the time between opening a hot water valve and hot water reaching a point of use by temporarily diverting the water to another point of use. The system and method embody a thermally sensitive valve arranged so as to permit the flow of cool water from a hot water supply line to be diverted to a point of use that is insensitive to the temperature of the water provided. Embodiments of the invention may also comprise timers that function to limit the amount of time that water may flow to a point of use that is insensitive to the temperature of the water provided. Such embodiments may operate without user intervention or may require that a user or other device provide a signal that causes the invention to divert water to a point of use that is insensitive to the temperature of water provided.

13 Claims, 4 Drawing Sheets

(56) References Cited

U.S. PATENT DOCUMENTS

| | | |
|---|---|---|
| 2004/0159353 A1 | 8/2004 | King |
| 2004/0244835 A1 | 12/2004 | Tsesarsky |
| 2005/0161086 A1 | 7/2005 | Kubik |
| 2006/0289065 A1 | 12/2006 | Adams |
| 2008/0302429 A1 | 12/2008 | Savinar et al. |
| 2009/0288715 A1 | 11/2009 | Granger, Sr. |
| 2011/0259437 A1* | 10/2011 | Thomasson ........... F16K 11/044 137/88 |
| 2011/0260827 A1* | 10/2011 | Shapiro ..................... E03B 1/04 340/3.1 |
| 2015/0308712 A1* | 10/2015 | Giamati ............. G05D 23/1393 392/451 |

* cited by examiner

ON-DEMAND HOT WATER REPURPOSING SYSTEM AND METHOD

This application claims the benefit of U.S. Provisional Patent Application No. 62/456,421, filed Feb. 8, 2017, which is hereby incorporated by reference in its entirety.

BACKGROUND AND SUMMARY OF THE INVENTION

Exemplary embodiments of the present invention relate generally to a system and method to enable hot water to arrive at a shower or other point of use in shorter time than that of conventional water systems.

Turning on a hot water faucet and having to wait for the hot water to arrive is a common problem for many users. Not only does this force the user to endure cold water or wait for cold water to pass through the pipes, this circumstance wastes water by allowing it to run down the drain. Thus, many known plumbing methods waste time, water, or both. There are known systems for recirculating water. Such systems generally comprise a pump and circular water system in which hot water from a water heater is circulated continuously through the pipes of a building such that hot water is circulated from a hot water source, through the building, and then back to the hot water source for reheating. Such systems are effective but waste energy, not only as the result of having to power a pump, but also because heat is radiated from the hot water pipes as the water is circulated through the plumbing system. What is needed is a system that allows a user to divert the cold water in a pipe such that when a hot water faucet or other point of use is selected, that hot water is available immediately. Embodiments of the invention may comprise temperature sensing valves configured to allow water below a desired temperature to be diverted to alternative uses. Embodiments may also comprise timing systems that limit the amount of time that water may be diverted. Other embodiments may comprise timers that automatically divert cold water from the hot water system such that it would be more likely that hot water may be available at the point of use without a wait.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness. In this description, the term connected to generally means in fluid communication therewith.

Known water systems generally comprise a cold water source from a well or municipality. This cold water source is directed to various points of use within a building. One such point of use may be a water heater. Cold water is provided to the water heater where its temperature may be raised using various methods. The hot water is then provided to points of use throughout the building, such as, but not limited to, a faucet used for washing dishes, or a shower may have both hot and cold water so that a user can adjust the temperature of the water by mixing the hot and cold sources in order to arrive at a desired temperature. However, not all points of use require hot water. For example, a toilet tank, pond, fountain, or irrigation system may not require hot water.

When the water heater is located some distance away from a point of use and there is no ongoing use of the heated water, water located in pipes between the water heater and point of use may begin to cool to ambient temperature. When this occurs, cooled water will initially flow instead of warm water at the point of use. Systems are known that utilize pumps to circulate this cooled water back to the water heater. Such systems may function to limit the initial flow of cooled water such that a user may not have to wait or waste water by allowing the water to run down the drain. However, such systems consume a great deal of energy in order to power the pump and reheat the cooled water that is returned to the water heater. These systems may also require the costly installation of electrical circuitry and return circulation piping. Such circulation systems may also result in mixing of previously heated water and cold water in the cold water piping. This may be a health concern, particularly when the previously heated water has passed through the water heater and been exposed to the sacrificial anode contained therein. Such exposure may be undesirable as the hot water may become contaminated by the sacrificial anode found in the water heater.

Figure 1:
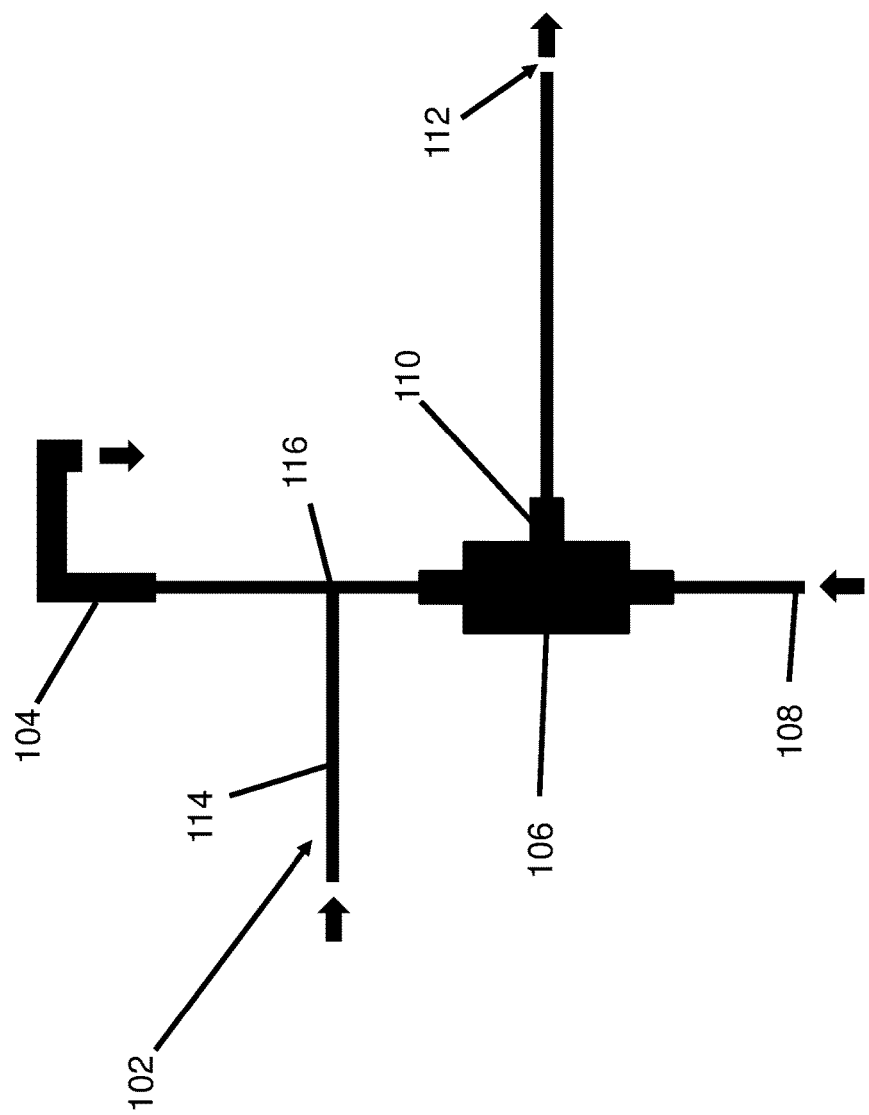
FIG. 1 is a diagram of a water system comprising an exemplary embodiment of the invention.

Exemplary embodiments of the present invention may not require a circulation pump system and also may not require that water be wasted by running cooled water out of the pipes and down the drain until warmed water arrives at the point of use. As illustrated in FIG. 1, in an exemplary embodiment of the invention, a heated water source 102 may be connected such that a flow of warm water may be made available to a point of use 104 and to a first input of a temperature sensitive valve 106. An example of a valve 106 may employ, without limitation, sensing and/or actuating mechanisms such as bimetal disks, bimetal accordions, expanding gas or fluid, and/or may be electromechanical in nature. As is illustrated, the valve 106 may also have a second input connected to a source of cold or otherwise unheated water 108. The valve may further have a third connection 110 that is used to output water to points of use that are insensitive to the temperature of the water provided 112. Examples of such points of use may include, without limitation, toilet tanks, washing machines, irrigation systems, etc.

In such an embodiment of the invention, a hot water supply line 114 may contain water that has cooled to a temperature below what may be desired for heated water as discussed above. However, in water systems that are fitted with embodiments of the invention, the temperature sensitive valve 106 may open or be in a default open (i.e., purging) position such that cooled water from the hot water supply line 114 (i.e., purge fluid or purge water) may be allowed to pass through the valve 106 and exit output 110 such that it is provided to an alternate cold or cooled water use point 112. In an exemplary embodiment, after a predetermined period of time or after sensing the temperature of the water has reached a predetermined threshold, valve 106 may be adapted to close.

Conversely, without employing an embodiment of the invention, cooled water in hot water supply line 114 would travel through the water lines to the point of use 104 where it would have to either be used in its cooled state or allowed to run down a drain until heated water from the hot water supply 102 has traveled through the hot water supply line 114, replacing the cooled water that was in the line, with the heated water eventually arriving at the point of use 104.

Figure 2:
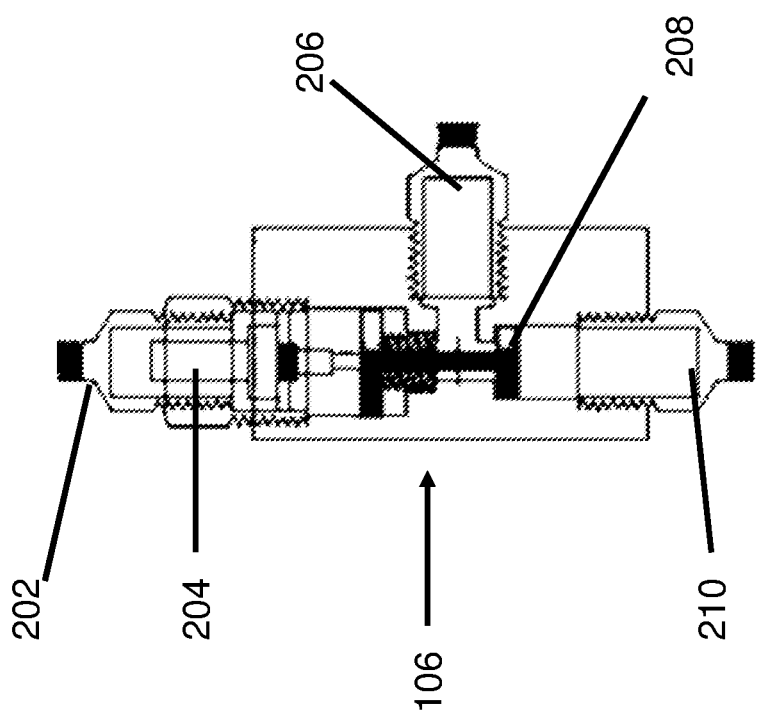
FIG. 2 is a diagram of a water valve used in an exemplary embodiment of the invention.

Such as is illustrated in FIG. 2 of one exemplary embodiment of valve 106, a hot water supply line may be connected at a hot water inlet port 202. Cooled water in the hot water supply line may be allowed to pass over a thermal actuator 204 and flow out of an exit or outlet port 206 that is in fluid communication with a point of use 112 (FIG. 1) that is insensitive to the temperature of the water provided. In a preferred embodiment of the invention, the thermal actuator 204 may be located such that water flowing from the hot water inlet port 202 passes across the thermal actuator 204 as it enters the valve 106. In other exemplary embodiments, a thermal actuator may be in another suitable location for sensing the temperature of the water. In this example, as the cooled water flows out of the hot water supply line 114 and through the valve 106, the water flowing across the thermal actuator 204 may increase in temperature, which may cause the actuator 204 to activate a valve member 208 (which may be a single or multipiece structure) that closes the hot water inlet port 202 with regard to the exit port 206.

An example of this valve may be configured as illustrated in FIG. 2. FIG. 2 shows an example of the valve member 208 in a position such that the hot water inlet port 202 is open to the exit port 206. When the hot water inlet port 202 is closed relative to the exit port 206, a cold or unheated water inlet port 210 is opened with regard to the exit port 206. Referring again to FIG. 1, when the cold or unheated water inlet port 210 is opened with regard to the exit port 206, water from a cold or unheated water supply 108 may flow through the valve 106 and be provided to a point of use insensitive to temperature 112. In this manner, a point of use 112 in an exemplary embodiment may be used to draw cooled water out of the hot water supply line 114 such that when hot water is required at the point of use 104, the amount of cooled water that must pass through the point of use before hot water arrives is reduced to only what may be held between junction 116 and the point of use 104. Thus, locating the junction 116 (which facilities flow to point of use 104 or valve 106) as close as is possible to the point of use 104 may result in a shorter wait time for hot water to arrive at the point of use after the valve 106 allows the cooled water to be diverted to a point of use that is insensitive to temperature 112.

As was noted above, when the water from the hot water supply line 114 increases to a desired level of warmth as the result of allowing the cooled water to flow out of the supply line, the thermal actuator 204 closes the hot water input 202 with regard to the exit port 206. At about the same time, the thermal actuator 204 opens the cold or unheated water inlet port 210. By closing the hot water inlet 202 and opening the cold or unheated water inlet 210 when sufficiently heated water is detected, cold or unheated water may be provided to a point of use insensitive to temperature 112 even after an exemplary embodiment of the invention has allowed cooled water to be removed from the hot water supply line 114.

Such functionality may allow whatever activity was being conducted at the point of use insensitive to temperature 112 to continue. For example, if that point of use was a toilet tank needing to be refilled, the valve 106 may permit cooled water to pass from the hot water inlet 202 to the exit port 206, whereby it may be provided to the toilet tank. When the water from the hot water supply line 114 warms, the valve 106 may switch positions such that it allows water from the cold or unheated water inlet 210 to be delivered to the toilet tank to complete the process of filling the tank.

Another exemplary point of use insensitive to temperature may be a sprinkler system. When the sprinkler is running, it may draw water from the hot water supply line 114 for the short time that the water flowing over or otherwise sensed by the thermal actuator 204 remains cool. When the water from the hot water supply line warms, the valve 106 may switch over to the cold or unheated water inlet 210 such that the sprinkler system may continue to run.

In certain exemplary embodiments of the invention, a timing device may be connected to an additional valve to limit the amount of water delivered to a point of use insensitive to temperature. Such an embodiment may be useful if the point of use doesn't have a self-limit feature. For example, a typical toilet tank inherently has a self-limit feature such that when the tank is full, a float valve shuts off the water supply. However, in a situation in which there is no self-limit (for example, a fish pond that needs to be supplied with fresh water from time to time in order to replenish what was lost to evaporation), a means may be provided to limit the amount of cooled, cold, or unheated water supplied both from the hot water supply line 114 and also the cold or unheated water inlet 210 so as not to overflow or otherwise provide so much water that the point of use 112 cannot accommodate it.

Figure 3:
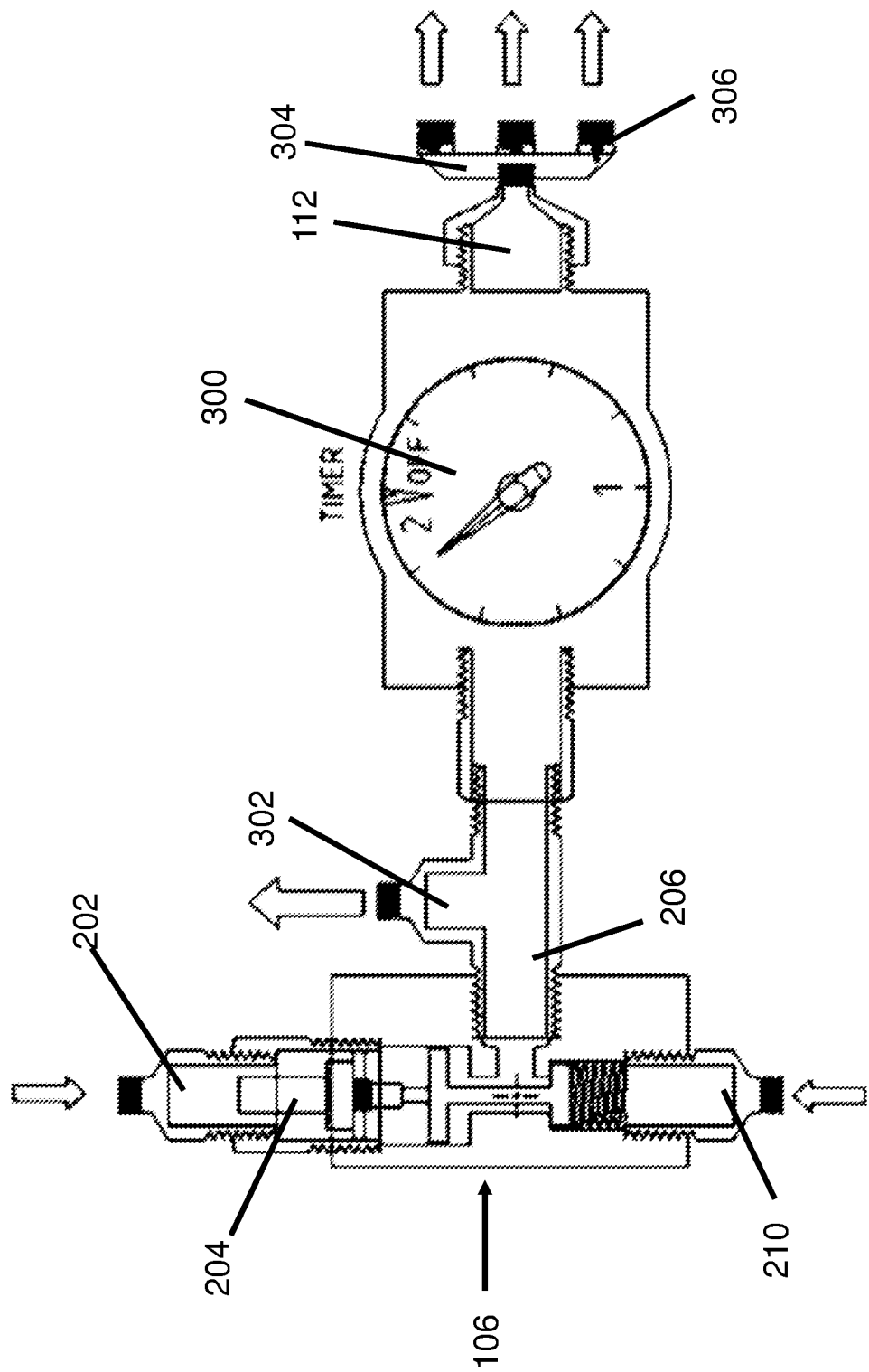
FIG. 3 is a diagram of a water valve used in an exemplary embodiment of the invention wherein the water valve further comprises a timer configured to divert cold water to alternate points of use.

An example of such an embodiment is illustrated in FIG. 3. As is shown, the temperature sensitive valve 106 may be connected as is illustrated in FIG. 1 such that a hot water inlet 202 and cold or unheated water inlet 210 are connected to or otherwise form the input connections of the valve 106. In this example, a timer 300 is associated with exit port 206. The timer 300 may be connected to a point of use insensitive to water temperature 112. The timer in such an embodiment may be used to control the time that water from either source (i.e., hot water inlet 202 or cold or unheated water inlet 210) is allowed to flow to a point of use 112. Thus, the timer may be used to prevent a continuous flow of water to a point of use 112 that otherwise may have no means of regulating the flow of water. For example, if the point of use 112 is a non-controlled irrigation system, providing a source of water without a timer or other means of stopping the flow after a period of time may result in an excessive use of water or flooding. Such as illustrated in FIG. 3, a manifold 304 may be used to direct this timer-controlled flow of water to a plurality of points of use. Such a manifold 304 may be further configured with individual valves 306 as illustrated in order to allow a user to further control the distribution of water.

In certain embodiments of the invention which comprise a timer, a cold or unheated water port may be located such that its flow is not controlled by the timer. Such a port 302 is illustrated in FIG. 3. An example, without limitation, of how such a port may be used is a toilet tank. Toilet tanks generally have valves that shut off the flow of water when the tank is full. As such, a timer is not necessary for such a flow path because the flow will be shut off before it becomes excessive.

Figure 4:
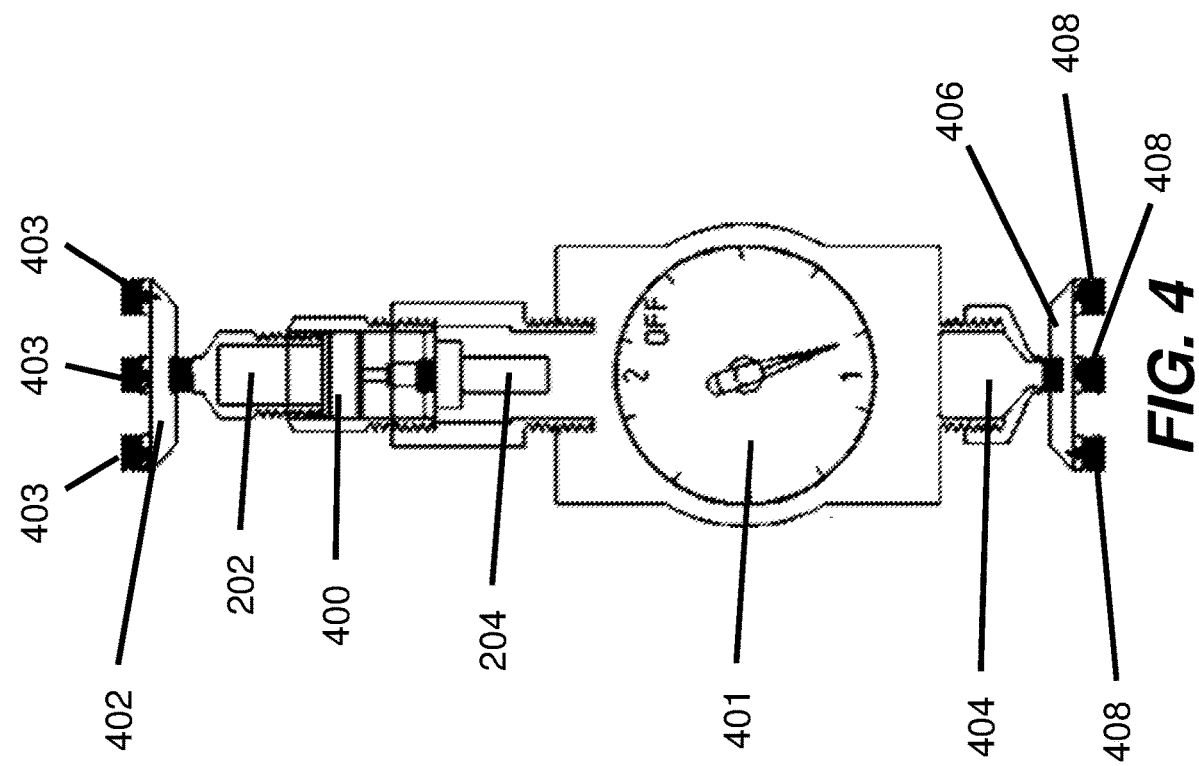
FIG. 4 is a diagram of a water valve used in an exemplary embodiment of the invention wherein the water valve comprises a timer to limit the amount of time that cold water may pass through the valve.

As illustrated in FIG. 4, some embodiments of the invention may be configured without a cold or unheated water source. In such a configuration, a hot water input 202 may be connected to or otherwise be a part of a valve comprising a thermal actuator 204. The hot water input 202 may be located at a point of use such as illustrated in FIG. 1. However, in such a configuration, the actuator 204 may comprise or otherwise be associated with a valve member 400 (which may be a single or multipiece structure) that controls the flow from the hot water input 202. FIG. 4 shows an example of the valve member 400 in an open position such that the hot water inlet port 202 is open to the exit port 404. When the water flowing into the hot water input 202 reaches a certain temperature, the valve member 400 will close. Such an arrangement may have an input manifold 402 that may further comprise one or more input connections 403 to preferably be connected in close proximity to points of hot water use, allowing a user to determine which point of use is desired to receive hot water more quickly as a result of the action of the invention. In other words, input ports 403 facilitate the receipt of cooled fluid (i.e., purge fluid) from multiple sources, or perhaps more preferably facilitate a selection of a source of sources of cooled fluid (i.e., purge fluid). As illustrated, a timer 401 may be positioned between the thermal actuator 204 and an output port 404. The output port 404 may further be connected to an output manifold 406, which may comprise a plurality of output connections 408. In the embodiment shown in FIG. 4, the timer 401, the output manifold 406, and/or another manifold such as the input manifold 402 may be controlled by command signal(s). For example, a command signal may be, without limitation, an electronic signal delivered via a wired or wireless connection, a push button, a switch, etc. (e.g., a switch incorporated into a faucet or other fixture). In certain embodiments, there may be more than one such command signal where each signal is associated with a point of hot water use. In such a configuration, the timer may be triggered when a user wishes to receive hot water at a point of use. In this embodiment, the timer 401 allows water to flow through the system of FIG. 4 for a predetermined period of time or until the thermal actuator 204 closes the valve member 400 to stop the flow of water. At this point, the cooled water from the hot water supply line 114 has been replaced with heated water such that when a user opens a faucet or other point of use 104, there is a minimal amount of cooled water that exits at the point of use before heated water is available.

Exemplary embodiments are described herein that implement a thermal actuator to control the opening and closing of a valve. While such embodiments may be particularly beneficial for controlling a valve based on the temperature of the fluid, other exemplary embodiments may use other suitable means for controlling a valve. For example, a valve may be configured to open or close after a predetermined period of time. For another example, the temperature of a portion of the valve may be monitored for controlling a valve. In yet another example, a valve may be configured to receive a signal that controls the opening or closing of a valve.

Furthermore, as noted herein, exemplary embodiments may be particularly useful for controlling the flows of hot and cold or unheated water. However, some exemplary embodiments may be used to control the flows of other types of fluid(s) (e.g., chemicals). Likewise, some exemplary embodiments may be used to control flows of fluid(s) having other temperatures.

It should also be recognized that a valve may transition between positions at any suitable speed depending on the construction of the valve. In some exemplary embodiments, a transition between positions may be fast or nearly instantaneous. In other exemplary embodiments, a transition may occur at a more gradual pace.

In summary, exemplary embodiments of the present invention may facilitate the distribution of a flow of fluid (e.g., cooled (i.e., purge) fluid (e.g., water)) to alternative points of use (e.g., points of use that are not sensitive to fluid temperature). Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:
1. A valve comprising:
a first input port adapted to receive a first flow of fluid;
a second input port adapted to receive a second flow of fluid;
an outlet port adapted to allow an output of fluid;
a valve member adapted to move between a first position and a second position, said valve member in said first position adapted to allow said first input port to be in fluid communication with said outlet port, said valve member in said second position adapted to allow only said second input port to be in fluid communication with said outlet port;
and a thermal actuator positioned to detect a temperature of only said first flow of fluid such that said valve member is adapted to be in said first position or said second position based on said temperature of only said first flow of fluid; wherein said valve member is adapted to be in said first position when said temperature of said first flow of fluid is below a predetermined threshold; and wherein said valve member is adapted to switch to said second position when said temperature of said first flow of fluid reaches said predetermined threshold.

2. The valve of claim 1 wherein: said first input port is adapted to be connected to a source of hot water; and said second input port is adapted to be connected to a source of cold or unheated water.

3. The valve of claim 1 wherein said valve member in said second position is configured to block fluid communication between said first input port and said outlet port.

4. The valve of claim 1 wherein said valve is temperature sensitive such that said valve member is adapted to move between said first position and said second position based on temperature.

5. The valve of claim 1 further comprising a timer associated with said outlet port such that said timer is adapted to control how long fluid is able to flow through said outlet port to a point of use.

6. The valve of claim 5 further comprising an additional port positioned between said outlet port and said timer such that said timer does not control how long fluid is able to flow through said additional port from said outlet port.

7. The valve of claim 1 further comprising a manifold associated with said outlet port such that said manifold is adapted to facilitate distribution of fluid from said outlet port to multiple points of use.

8. A fluid control system comprising:
a source of hot water;
a source of cold or unheated water; and
a valve comprising:
(a) a first input port adapted to receive a first flow of water from said source of hot water;
(b) a second input port adapted to receive a second flow of water from said source of cold or unheated water;
(c) an outlet port adapted to allow an output of water;
(d) a valve member adapted to move between a first position and a second position, said valve member in said first position adapted to allow said first input port to be in fluid communication with said outlet port, said valve member in said second position adapted to allow only said second input port to be in fluid communication with said outlet port; and
(e) a thermal actuator positioned to detect a temperature of only said first flow of water such that said valve member is adapted to be in said first position or said second position based on said temperature of only said first flow of water; wherein said valve member is adapted to be in said first position when said temperature of said first flow of water is below a predetermined threshold; and wherein said valve member is adapted to switch to said second position when said temperature of said first flow of water reaches said predetermined threshold.

9. The system of claim 8 wherein said valve member in said second position is configured to block fluid communication between said first input port and said outlet port.

10. The system of claim 8 wherein said valve is temperature sensitive such that said valve member is adapted to move between said first position and said second position based on temperature.

11. The system of claim 8 further comprising a timer associated with said outlet port such that said timer is adapted to control how long water is able to flow through said outlet port to a point of use.

12. The system of claim 11 further comprising an additional port positioned between said outlet port and said timer such that said timer does not control how long water is able to flow through said additional port from said outlet port.

13. The system of claim 8 further comprising a manifold associated with said outlet port such that said manifold is adapted to facilitate distribution of water from said outlet port to multiple points of use.

* * * * *